(12) United States Patent
Buchert

(10) Patent No.: US 8,722,948 B2
(45) Date of Patent: *May 13, 2014

(54) METHOD FOR CATALYTICALLY PROCESSING SLURRY

(76) Inventor: Jürgen Buchert, Schweinfurt (DE)

( * ) Notice: Subject to any disclaimer, the term of this patent is extended or adjusted under 35 U.S.C. 154(b) by 964 days.

This patent is subject to a terminal disclaimer.

(21) Appl. No.: 12/841,462

(22) Filed: Jul. 22, 2010

(65) Prior Publication Data

US 2010/0288622 A1 Nov. 18, 2010

Related U.S. Application Data

(62) Division of application No. 11/854,857, filed on Sep. 13, 2007, now Pat. No. 7,803,333.

(30) Foreign Application Priority Data

Mar. 10, 2007 (DE) .......................... 10 2007 011 763

(51) Int. Cl.
  *C07C 1/00* (2006.01)
  *C10G 1/10* (2006.01)
(52) U.S. Cl.
  USPC ............... 585/240; 585/242; 201/2.5; 201/4; 201/25; 201/30
(58) Field of Classification Search
  USPC ......... 201/2.5, 4, 16, 21, 25, 30, 33; 585/240, 585/242; 202/84, 96, 99, 112, 117, 118, 202/175, 209; 422/215, 224; 366/181.8, 366/182.2, 185.2, 342

See application file for complete search history.

(56) References Cited

U.S. PATENT DOCUMENTS

| | | | | |
|---|---|---|---|---|
| 3,708,270 | A | * | 1/1973 | Huber et al. ..................... 48/202 |
| 3,736,111 | A | * | 5/1973 | Gardner et al. .................. 48/111 |
| 4,129,420 | A | * | 12/1978 | Koppelman .................... 44/500 |
| 7,473,348 | B2 | | 1/2009 | Koch ............................ 208/113 |
| 8,282,787 | B2 | * | 10/2012 | Tucker ............................ 201/41 |
| 2006/0112639 | A1 | * | 6/2006 | Nick et al. .................. 48/198.1 |

FOREIGN PATENT DOCUMENTS

| | | |
|---|---|---|
| DE | 38 26 520 C2 | 7/1992 |
| DE | 69312723 T2 | 12/1997 |
| DE | 21 2004 000 012 | 1/2006 |

* cited by examiner

*Primary Examiner* — Nina Bhat
*Assistant Examiner* — Jonathan Miller
(74) *Attorney, Agent, or Firm* — Henry M Feiereisen LLC

(57) ABSTRACT

In a method for thermal processing of slurry, slurry is combined with a bio-mass to produce a mixture. The mixture is subjected in a heated mixer pump to a cracking temperature, thereby allowing the mixture to catalytically undergo a cracking reaction to produce a reaction mixture which is directly outgased in the mixer pump to produce an outgased portion and a solid portion. The outgased portion and the solid portion are separately discharged from the mixer pump; with the low boiling fraction of the outgased portion allowed to cool down for further processing, and the solid portion collected in a residual matter container for further processing.

17 Claims, 1 Drawing Sheet

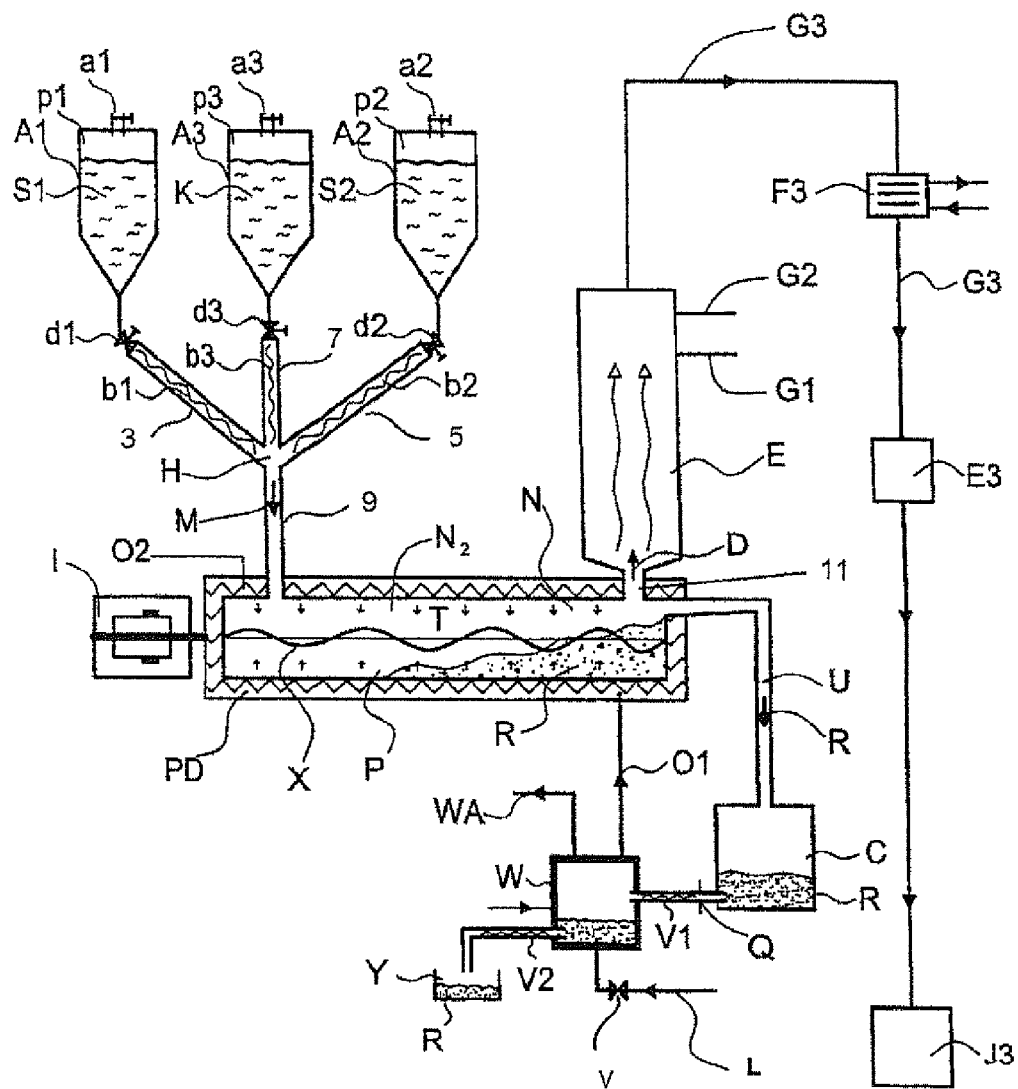

METHOD FOR CATALYTICALLY PROCESSING SLURRY

CROSS-REFERENCES TO RELATED APPLICATIONS

This application is a divisional of prior filed copending U.S. application Ser. No. 11/854,857, filed Sep. 13, 2007, the priority of which is hereby claimed under 35 U.S.C. §120, and which claims the priority of German Patent Application, Serial No. 10 2007 011 763.0, filed Mar. 10, 2007, pursuant to 35 U.S.C. 119(a)-(d).

The contents of U.S. application Ser. No. 11/854,857 and German Patent Application, Serial No. 10 2007 011 763.0 are incorporated herein by reference in its entirety as if fully set forth herein.

BACKGROUND OF THE INVENTION

The present invention relates to a method and apparatus for catalytically processing slurry.

Nothing in the following discussion of the state of the art is to be construed as an admission of prior art.

To ensure clarity, it is necessary to establish the definition of several important terms and expressions that will be used throughout this disclosure. The term "slurry" is used here in a generic sense and may refer to sewer sludge in general, or to partly dried sludge having a moisture content of less than or little more than 10% of water. Partly dried sludge typically contains 60% of inorganic material, about 30% of organic material, and about 10% of water. Of course, sludge of greater water content may be applicable here as well.

Disposal of slurry that has accumulated in industrial plants or sewage plants poses a problem because farmers or agriculturists use slurry less and less to fertilize fields. The reason is the content of organic toxic agents and heavy metals that pose a risk to health and may be passed on to plants and fruits that grow on the fields. It is clear that entry of these types of materials into the food chain must be prevented.

It would therefore be desirable and advantageous to address this problem and to obviate other prior art shortcomings.

SUMMARY OF THE INVENTION

According to one aspect of the present invention, a method of thermally processing slurry, includes the steps of combining slurry with a bio-mass to produce a mixture, subjecting the mixture in a heated mixer pump to a cracking temperature, thereby allowing the mixture to catalytically undergo a cracking reaction to produce a reaction mixture, directly outgasing the reaction mixture in the mixer pump to produce an outgased portion and a solid portion, separately discharging the outgased portion and the solid portion from the mixer pump, allowing the outgased portion to cool down for further processing, and collecting the solid portion in a residual matter container for further processing.

According to another feature of the present invention, the cracking temperature may range from 250° C. to 380° C.

According to another feature of the present invention, the slurry and the bio-mass may be united upstream of the mixer pump.

According to another feature of the present invention, a catalyst may be added to the slurry and/or bio-mass. Suitably, the catalyst is added during the phase when the slurry and the bio-mass are united. The addition of an external catalyst is however contemplated only in an exceptional case because the slurry contains per se substances that cause a catalytic effect on the thermal reaction. In other words, the additional admixture of an external catalyst or even several external catalysts is normally not required to thermally crack organic substances.

According to another feature of the present invention, pure oxygen ($O_2$) or air may be added to the solid portion. This should be performed in a controlled manner. As a beneficial result of the addition of oxygen or air, the temperature of the solid portion can be greatly increased so that the generated heat can be reintroduced into the process and exploited for pre-heating the substance(s) and/or heating the mixer pump, for example.

According to another feature of the present invention, the bio-mass may be biological waste material, e.g. rape residues or wood residues, e.g. sawdust, sugar beet residues, husks obtained during beer brewing or liquor production, animal meal, cellulose from paper production, press cake from feedstock production for animals, straw and the like, as well as other substances, such as various grains, corn, etc. Thus, in addition to the organic fraction of the slurry, biological mass, which is also considered difficult to recycle, can be disposed of. In addition, residual matter, i.e. the solid portion of the reaction mixture, is produced, whereby the energy content of which can be exploited for generating electricity and/or heat for a wide range of applications.

According to another aspect of the present invention, an apparatus for thermally processing slurry includes a first reservoir for accepting slurry, a second reservoir for accepting bio-mass, a mixer pump connected to the first and second reservoirs and heatable to a cracking temperature to produce a reaction mixture, an outgas passageway connected to the mixer pump for receiving an outgased portion of the reaction mixture, a distillation column connected to the outgas passageway to produce at least one fraction from the outgased portion of the reaction mixture, a condenser disposed downstream of the distillation column for delivery of the at least one fraction of the distilled reaction mixture in a liquefied form, and a residual matter container connected to the mixer pump by a conduit for temporary acceptance of a solid portion of the reaction mixture.

According to another feature of the present invention, the mixer pump may be a LIST-mixer. Using a LIST-mixer realizes a thorough and intimate mixing of the supplied substances in addition to a catalytic-thermal separation of outgased volatile substances and solid portions (residual matter).

According to another feature of the present invention, slurry and bio-mass may be maintained under nitrogen ($N_2$) pressure. Nitrogen may hereby be supplied to the slurry reservoir and/or the bio-mass reservoir.

According to another feature of the present invention, a third reservoir may be connected to the mixer pump for adding a catalyst to a mixture of slurry and bio-mass. As noted above, the extra addition of a catalyst mass is normally not required as slurry contains already substances that serve as a catalyst or catalysts.

According to another feature of the present invention, the mixer pump may include a motor-driven transport worm for advancing the reaction mixture.

According to another feature of the present invention, a heat recovery container may be connected to the residual matter container. In this way, thermal energy gained from the recovered heat can be used for various purposes and thus reintroduced into the process. Suitably, the heat recovery container may be supplied with oxygen or air to elevate the temperature of the solid portion. This should be performed in a controlled manner so that a predetermined maximum is not exceeded.

According to another feature of the present invention, the heat recovery container may be constructed of double-jacketed configuration for connection to a thermal oil circulation. As a result, generated heat can be transported further. Suitably, the thermal oil circulation is used for heating the mixer pump. The heat recovery container may be operatively connected to a turbine and a generator which is operatively connected to the turbine for converting thermal energy in the form of steam and gained by the heat recovery container into electric energy that can be fed into the public power grid.

According to another feature of the present invention, an end product container may be connected to or associated with the heat recovery container. Suitably, the catalyst may be recovered from the solid portion by connecting the end product container to a recovery device for recapture of catalyst.

The fraction produced by the distillation column may be used as a fuel.

The present invention is based on the recognition that a combination of slurry with a biological mass (bio-mass) and subjecting this mixture to a thermal process triggers a catalytic process by which organic substances in the slurry as well as in the bio-mass substantially break down. The catalytic process is triggered by substances in the slurry that have a catalytic effect on the bio-mass. Most likely, these substances involve mineral constituents of the slurry. Even though the thermal-catalytic effect on the bio-mass depends on the slurry composition which may greatly vary. Still, tests have shown that slurry, e.g. originating from municipal sewage plants or industrial plants, in particular in the form of "partly dried slurry", and the added bio-mass can react in accordance with the present invention in such a way that organic constituents from both starting materials can be catalytically cracked. What is left after the catalytic reaction is merely solid matter that can easily be stored for example. Overall, the apparatus and the method according to the invention can be realized in a cost-efficient and simple manner while being reliable in operation.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of one embodiment of an apparatus for catalytically processing of slurry in accordance with the present invention.

DETAILED DESCRIPTION OF PREFERRED EMBODIMENTS

The depicted embodiment is to be understood as illustrative of the invention and not as limiting in any way. It should also be understood that the FIGURE is not necessarily to scale. Details which are not necessary for an understanding of the present invention or which render other details difficult to perceive may have been omitted.

This is one of two applications both filed on the same day. Both applications deal with related inventions. They are commonly owned and have the same inventive entity. Both applications are unique, but incorporate the other by reference. Accordingly, the following U.S. patent application Ser. No. 11/854,874, now patented under U.S. Pat. No. 7,799,960, is hereby expressly incorporated by reference: "Method and Apparatus for Thermal Processing of Slurry".

Turning now to the sole FIGURE, there is shown, by way of example, a schematic illustration of one embodiment of an apparatus for catalytically processing of slurry in accordance with the present invention. The apparatus includes a first reservoir A1 having a closeable inlet a1 for accepting slurry S1, e.g. finely particulate, partly dried sewage sludge having a water content of at most 10%. Arranged at the lower end of the reservoir A1 is a metering valve d1, e.g. a controllable supply unit, which may cooperate with or may be connected to a transport unit in the form of a worm b1 for moving the slurry S1 from the reservoir A1 along a conduit 3. Inside the reservoir A1 above the slurry level is a nitrogen cushion p1. A further reservoir A2 receives finely particulate or fine-grained bio-mass S2 via a closeable inlet a2. The bio-mass S2 may involve agricultural waste products or any of the products mentioned above. Discharge of bio-mass S2 from the reservoir A2 is controlled by a metering valve d2 by which the amount of outgoing bio-mass S2 into a conduit 5 can be regulated, with the assistance of a transport unit having a worm b2. A nitrogen cushion p2 may also be formed above the bio-mass level in the reservoir A2.

The conduits 3, 5 from the reservoirs A1, A2, respectively, are united at a mixing site H where the slurry S1 and the bio-mass S2 are combined to produce a mixture M.

A third reservoir A3 receives fine-grained catalyst mass K via a closeable inlet a3. Arranged at the lower end of the reservoir A3 is a metering valve d3 and a transport unit with a worm b3 inside a conduit 7, which is connected to the mixing site H. An example of a catalyst involved here is a catalyst commercially available under the tradename "Tricat 407" by the company Tricat, having a place of business at Chemiepart-Str., D-06749 Bitterfeld, Germany.

The mixture M is conducted from the mixing site H via a conduit 9 to a mixer pump P which causes a thorough and intimate mixing of the incoming mixture M and heating of the mixture M to cracking temperature T. The introduction of heat is indicated here by short arrows. The cracking temperature T may range from about 250° C. to about 380° C. The mixer pump P is hereby constructed in the form of an elongated LIST-mixer and includes a motor-driven transport worm X for advance of the mixture M. Operation of the transport worm X is realized by an electric motor I.

The mixer pump P is constructed of double-jacketed configuration so as to define a passageway PD which is part of a thermal oil heat circulation O1, O2. An example of thermal oil includes Meganol 420. As a result of the elevated temperature T in the mixer pump P, organic molecules of the mixture M are subjected to a thermal cracking process. Substances, in particular mineral fractions of the slurry S1, in the mixture M act hereby as catalyst for the cracking reaction. After undergoing the thermal cracking process, a liquid reaction mixture N is formed in which the organic substances have been broken down to a large extent as a consequence of the thermal cracking process. The reaction mixture N now includes an outgased portion D and a solid portion R. The solid portion R has a powdery form and accumulates in the mixer pump P in the form of a mound. The mixer pump P thus has two functions: On one hand, the mixer pump P assists a thorough mixing of the reaction mixture N resulting from the mixture M, and on the other hand, the mixer pump P effects a shearing of particles in the reaction mixture N so that the surface is enlarged and efficiency is increased.

The outgased portion D and the solid portion R are then transferred from here for further processing. The volatile outgased portion D is hereby transferred via a short outgas passageway 11 into a distillation column E in which the volatile fraction D is separated into a high boiling fraction G1, medium boiling fraction G2, and low boiling fraction G3. For ease of illustration and sake of simplicity, much of the following description is made only in relation to a further processing of the low boiling fraction G3, when in fact the further processing of fractions G1, G2 is implemented in a like manner. The low boiling fraction is extracted from the head of the distillation column E.

The fraction G3 is conducted to a condenser F3 in which the fraction G3 is cooled down and liquefied. Heat generated hereby can be utilized in the process, e.g., for preheating the slurry S1, bio-mass S2, or catalyst K. The liquefied fraction G3 is then conducted via an after-distillation device E3 into a collector or tank J3 for further processing, e.g. as a fuel for generating energy, such as fuel similar to diesel fuel.

As described above, the solid portion R collects in the mixer pump P in the form of a mound which grows until solid matter is able to escape via an upper opening into a conduit U which ports into a residual matter container C. Of course, the transfer of solid portion R into the container C may be assisted by a conveyance device. The container C is provided to temporarily store residual solid matter R at a temperature of e.g. 300° C.

With the assistance of a transport unit, which includes, e.g. a basically horizontal discharge worm V1, solid matter R is transferred via a lock Q into a heat recovery container W with exhaust gas line WA. The heat recovery container W is connected via a transport unit including a discharge worm V2 with an end product container Y by which the solid matter R is collected and, after cooling down, can be disposed, e.g. in a waste dump. As an alternative, the solid matter R may also be transferred directly or via an interposed transport unit to an unillustrated catalyst recovery device by which catalyst mass K in the solid matter R can be recuperated.

The heat recovery container W has two special features. On one hand, a valve V is provided for controlled supply of air L or pure oxygen ($O_2$) into the interior of the heat recovery container W, and, on the other hand, the heat recovery container W is constructed of double-jacketed configuration so as to define a passageway which is part of a thermal oil heat circulation O1, O2, with reference sign O1 designating the feed, and reference sign O2 designating the return. The thermal oil circulation O1, O2 includes hereby the passageway PD of the mixer pump P. Heat generated in the heat recovery container W is thus used to heat the thermal oil, e.g. up to 400° C., and thus for cracking the mixture M in the mixer pump P. Of course, the application of an optional additional heat source may be conceivable as well. Alternatively, heat generated in the container W may also be used for driving a turbo-generator and thus for generating electricity. Using the valve V and an unillustrated temperature measuring instrument, the supply of air L or oxygen can be controlled to prevent the temperature from exceeding 400° C., for example. A temperature control is important because an uncontrolled supply of air L or oxygen into the heat recovery container W may cause excessive heating of the solid matter R. The contemplated temperature of, e.g., 300° C. in the container C can be significantly exceeded; for example it may reach 700° C. Such an excessive temperature would adversely affect the used thermal oil. The controlled supply of air L or oxygen avoids excessive heating above 400° C., for example.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of thermal processing of slurry, comprising the steps of:
   combining slurry with a bio-mass to produce a mixture;
   subjecting the mixture in a heated mixer pump to a cracking temperature, thereby allowing the mixture to undergo a cracking reaction to produce a reaction mixture;
   directly outgasing the reaction mixture in the mixer pump to produce an outgased portion and a solid portion;
   separately discharging the outgased portion and the solid portion from the mixer pump;
   allowing the outgased portion to cool down for further processing;
   collecting the solid portion in a residual matter container for further processing.

2. The method of claim 1, wherein the cracking temperature is in the range of about 250° C. to about 380° C.

3. The method of claim 1, wherein the combining step is executed upstream of the mixer pump.

4. The method of claim 1, further comprising the step of adding a catalyst to at least one member selected from the group consisting of slurry and bio-mass.

5. The method of claim 4, wherein the catalyst is added during the combining step of slurry and bio-mass.

6. The method of claim 1, further comprising the step of dewatering at least one member selected from the group consisting of slurry and bio-mass before the combining step.

7. The method of claim 1, wherein the subjecting step is executed in the presence of a nitrogen ($N_2$) atmosphere.

8. The method of claim 1, further comprising the step of adding pure oxygen ($O_2$) or air to the solid portion in a controlled manner.

9. The method of claim 1, further comprising the step of removing heat from the solid portion.

10. The method of claim 9, further comprising the step of feeding back heat removed from the solid portion.

11. The method of claim 10, wherein the removed heat is used for heating at least one member selected from the group consisting of slurry and bio-mass.

12. The method of claim 10, wherein the removed heat is used for heating the mixer pump.

13. The method of claim 10, wherein the removed heat is used for generating electricity.

14. The method of claim 1, wherein the bio-mass is a biological waste material.

15. The method of claim 14, wherein the biological waste material includes rape residues or wood residues.

16. The method of claim 4, wherein at least one member selected from the group consisting of slurry, bio-mass, and catalyst, has a fine-grained structure.

17. The method of claim 4, further comprising the step of recovering catalyst mass from the solid portion.

* * * * *